United States Patent
Marchard et al.

(10) Patent No.: US 9,404,527 B2
(45) Date of Patent: Aug. 2, 2016

(54) DRIVE SHAFT ASSEMBLY FOR A DOWNHOLE MOTOR

(71) Applicant: National Oilwell Varco, L.P., Houston, TX (US)

(72) Inventors: Nicholas Ryan Marchard, Edmonton (CA); Frederick William Pheasey, Edmonton (CA)

(73) Assignee: NATIONAL OILWELL VARCO, L.P, Houston, TX (US)

( * ) Notice: Subject to any disclaimer, the term of this patent is extended or adjusted under 35 U.S.C. 154(b) by 183 days.

(21) Appl. No.: 14/081,702

(22) Filed: Nov. 15, 2013

(65) Prior Publication Data

US 2014/0299382 A1    Oct. 9, 2014

Related U.S. Application Data

(60) Provisional application No. 61/809,996, filed on Apr. 9, 2013.

(51) Int. Cl.
 *E21B 4/02* (2006.01)
 *F16C 1/04* (2006.01)
 *E21B 4/00* (2006.01)

(52) U.S. Cl.
 CPC . *F16C 1/04* (2013.01); *E21B 4/006* (2013.01); *E21B 4/02* (2013.01)

(58) Field of Classification Search
 CPC ..................................... E21B 4/02; F16D 3/10
 See application file for complete search history.

(56) References Cited

U.S. PATENT DOCUMENTS

| | | | |
|---|---|---|---|
| 899,913 | A | 9/1908 | Shaw |
| 1,311,679 | A | 7/1919 | Chalifoux |
| 1,732,354 | A | 10/1929 | Herbert |
| 1,838,310 | A | 12/1931 | Hubbel |
| 2,140,295 | A | 12/1938 | Mallard |
| 2,402,238 | A | 6/1946 | Carpenter |
| 4,263,788 | A | 4/1981 | Beimgraben |
| 4,772,246 | A | 9/1988 | Wenzel |
| 4,982,801 | A | 1/1991 | Zitka et al. |
| 5,000,723 | A | 3/1991 | Livingstone |
| 5,048,622 | A | 9/1991 | Ide |
| 5,078,650 | A | 1/1992 | Foote |
| 5,267,905 | A | 12/1993 | Wenzel et al. |

(Continued)

FOREIGN PATENT DOCUMENTS

| | | |
|---|---|---|
| CA | 1290952 C | 10/1991 |
| CA | 2023042 C | 4/1994 |
| CA | 2541339 C | 5/2012 |

*Primary Examiner* — William P Neuder
(74) *Attorney, Agent, or Firm* — Conley Rose P.C.

(57) ABSTRACT

A driveshaft assembly for a downhole motor including a driveshaft having a longitudinal axis, first and second ends, and a convex spherical bearing surface disposed at the first end configured to transfer axial loads. The assembly also includes a connection lug disposed at the driveshaft first end, extending circumferentially between first and second ends, and including a recess in the first end of the lug, the recess comprising a concave cylindrical surface concentrically disposed about a pivot axis oriented orthogonal to the longitudinal axis. The assembly also includes a torque transfer key disposed within the recess and having a central axis radially spaced from the pivot axis, a convex cylindrical surface concentrically disposed about the pivot axis, and a planar surface. The convex cylindrical surface of the key slidingly engages the concave cylindrical surface of the recess; and the pivot axis intersects the key.

20 Claims, 13 Drawing Sheets

(56) References Cited

U.S. PATENT DOCUMENTS

| | | |
|---|---|---|
| 5,288,271 A | 2/1994 | Nelson et al. |
| 5,704,838 A | 1/1998 | Teale |
| 7,186,182 B2 | 3/2007 | Wenzel et al. |
| 8,033,917 B2 | 10/2011 | Prill et al. |
| 8,157,025 B2 | 4/2012 | Johnson |
| 8,900,062 B2 * | 12/2014 | Nicol-Seto .............. E21B 17/03 464/136 |
| 2011/0005839 A1 | 1/2011 | Marchand et al. |

* cited by examiner

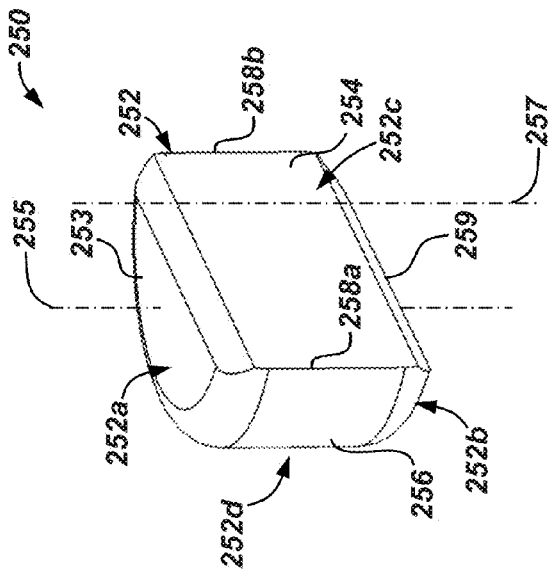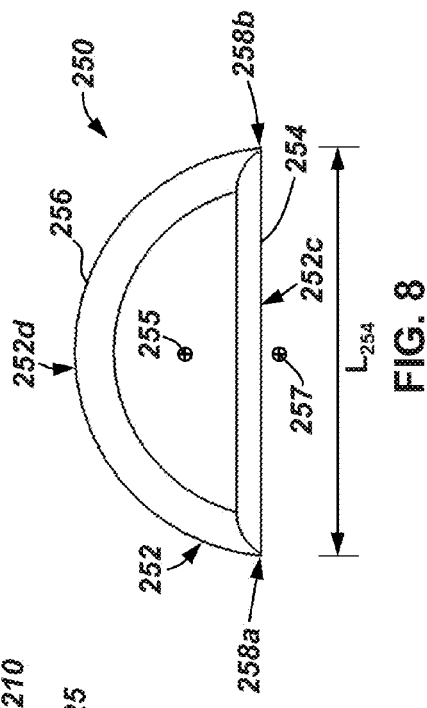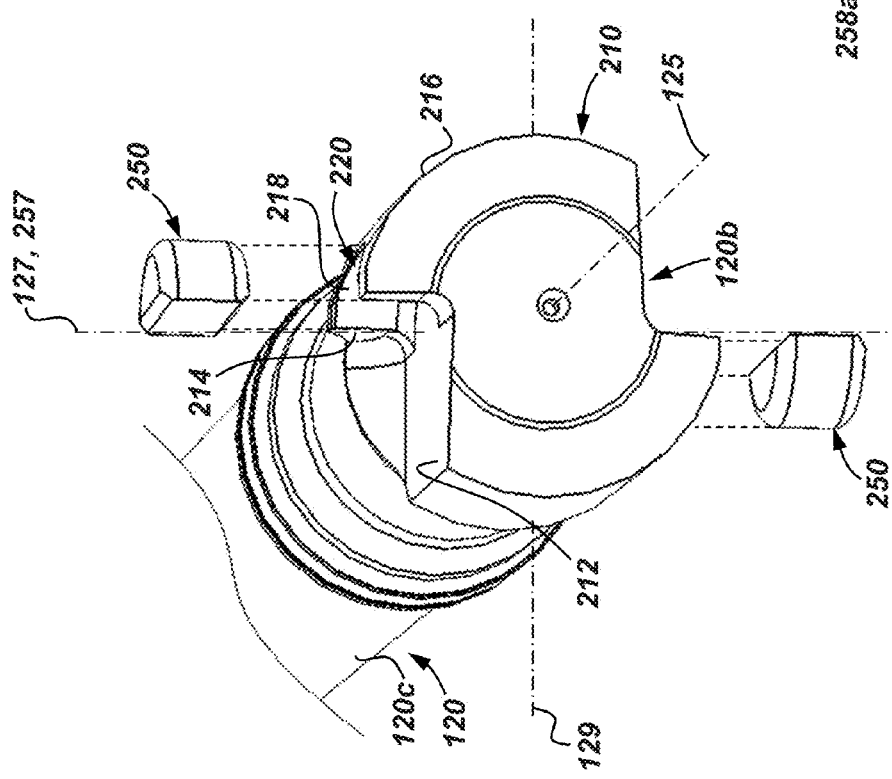

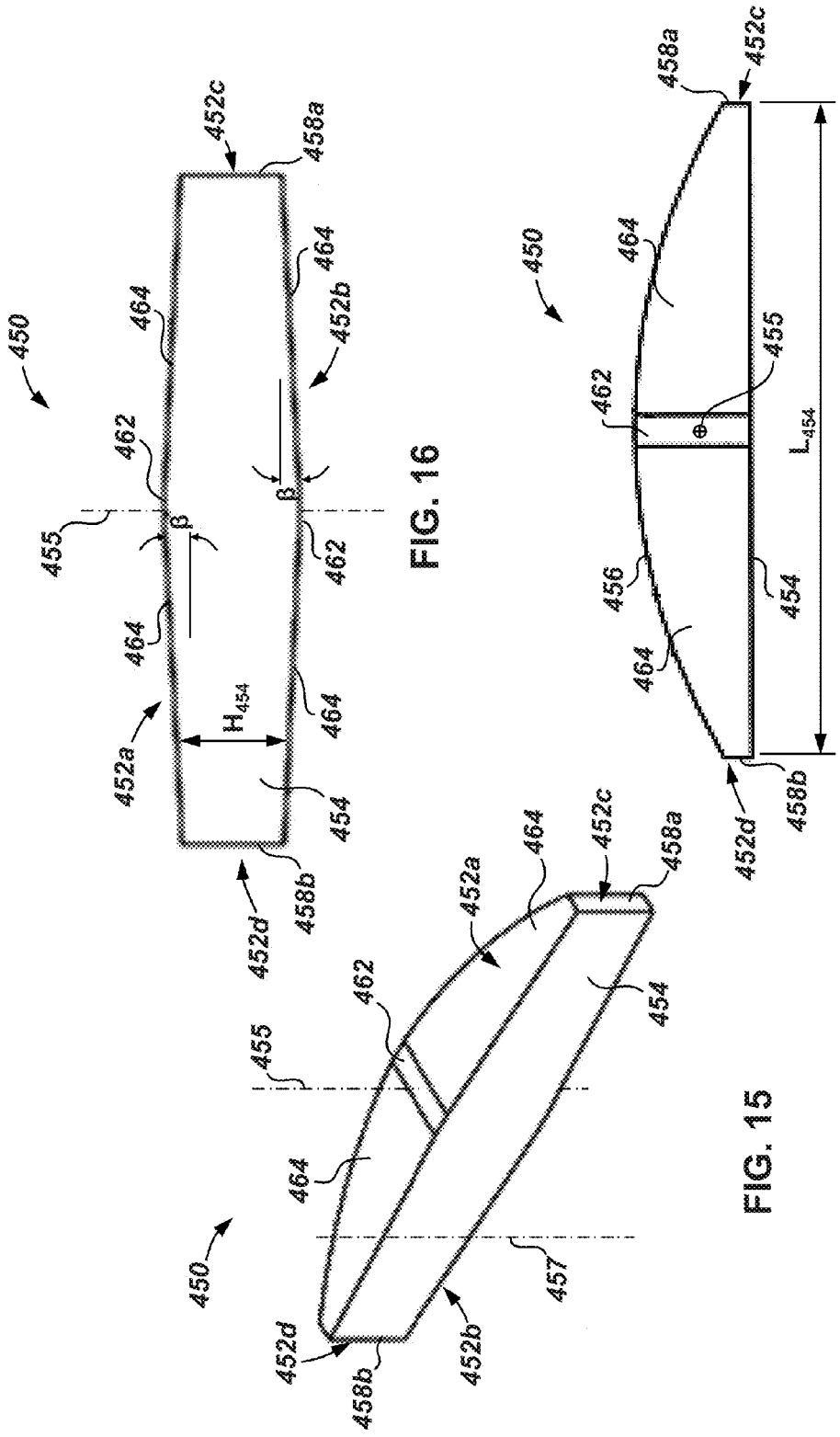

DRIVE SHAFT ASSEMBLY FOR A DOWNHOLE MOTOR

CROSS-REFERENCE TO RELATED APPLICATIONS

This application claims benefit of U.S. provisional patent application Ser. No. 61/809,996 filed Apr. 9, 2013, and entitled "Drive Shaft Assembly for a Downhole Motor," which is hereby incorporated herein by reference in its entirety.

STATEMENT REGARDING FEDERALLY SPONSORED RESEARCH OR DEVELOPMENT

Not applicable.

BACKGROUND

The disclosure relates generally to universal joints for transmitting torque between rotating shafts having intersecting but non-coincident rotational axes. More particularly, the disclosure relates to universal joints for driveshafts employed in downhole motors used in the oil and gas drilling operations.

In drilling a borehole into an earthen formation, such as for the recovery of hydrocarbons or minerals from a subsurface formation, it is conventional practice to connect a drill bit onto the lower end of a drillstring formed from a plurality of pipe joints connected together end-to-end, and then rotate the drill string so that the drill bit progresses downward into the earth to create a borehole along a predetermined trajectory. In addition to pipe joints, the drillstring typically includes heavier tubular members known as drill collars positioned between the pipe joints and the drill bit. The drill collars increase the vertical load applied to the drill bit to enhance its operational effectiveness. Other accessories commonly incorporated into drill strings include stabilizers to assist in maintaining the desired direction of the drilled borehole, and reamers to ensure that the drilled borehole is maintained at a desired gauge (i.e., diameter). In vertical drilling operations, the drillstring and drill bit are typically rotated from the surface with a top dive or rotary table.

During the drilling operations, drilling fluid or mud is pumped under pressure down the drill string, out the face of the drill bit into the borehole, and then up the annulus between the drill string and the borehole sidewall to the surface. The drilling fluid, which may be water-based or oil-based, is typically viscous to enhance its ability to carry borehole cuttings to the surface. The drilling fluid can perform various other valuable functions, including enhancement of drill bit performance (e.g., by ejection of fluid under pressure through ports in the drill bit, creating mud jets that blast into and weaken the underlying formation in advance of the drill bit), drill bit cooling, and formation of a protective cake on the borehole wall (to stabilize and seal the borehole wall).

Recently, it has become increasingly common and desirable in the oil and gas industry to drill horizontal and other non-vertical boreholes (i.e., "directional drilling"), to facilitate more efficient access to and production from larger regions of subsurface hydrocarbon-bearing formations than would be possible using only vertical boreholes. In directional drilling, specialized drill string components and "bottom hole assemblies" are used to induce, monitor, and control deviations in the path of the drill bit, so as to produce a borehole of desired non-vertical configuration.

Directional drilling is typically carried out using a downhole or mud motor incorporated into the bottom hole assembly (BHA) immediately above the drill bit. A typical downhole motor includes several primary components, such as, for example (in order, starting from the top of the motor assembly): (1) a top sub adapted to facilitate connection to the lower end of a drill string ("sub" being the common general term in the oil and gas industry for any small or secondary drill string component); (2) a power section; (3) a drive shaft enclosed within a drive shaft housing, with the upper end of the drive shaft being coupled to the lower end of the rotor of the power section; and (4) a bearing assembly (which includes a mandrel with an upper end coupled to the lower end of the drive shaft, plus a lower end adapted to receive a drill bit). The power section is typically a progressive cavity or positive displacement motor (PD motor). In a PD motor, the rotor comprises a shaft formed with one or more helical vanes or lobes extending along its length, and the stator is formed of an elastomer liner bonded to the inner cylindrical wall of the stator housing. The liner defines helical lobes complementary to that of the rotor lobe or lobes, but numbering one more than the number of rotor lobes. The lower end of the rotor comprises an output shaft, which in turn is coupled to the upper end of a drive shaft that drives the rotation of the drill bit.

In drilling operations employing a downhole motor, drilling fluid is circulated under pressure through the drill string and back up to the surface as previously described. However, in route to the drill bit, the pressurized drilling fluid flows through the power section of the downhole motor to generate rotational torque to rotate the drill bit. In particular, high-pressure drilling fluid is forced through the power section, causing the rotor to rotate within the stator, and inducing a pressure drop across the power section (i.e., the drilling fluid pressure being lower at the bottom of the power section). The power delivered to the output shaft is proportional to the product of the volume of fluid passing through the power section multiplied by the pressure drop across the power section (i.e., from fluid inlet to fluid outlet). Accordingly, a higher rate of fluid circulation fluid through the power section results in a higher rotational speed of the rotor within the stator, and correspondingly higher power output.

As previously noted, the output shaft is coupled to the upper end of the drive shaft, for transmission of rotational torque to the drill bit. However, the motion of the rotor in a PD motor is eccentric in nature, or "precessional"—i.e., in operation, the lower end of the rotor (i.e., the output end) rotates or orbits about the central longitudinal axis of the stator housing. The output shaft is coupled to the upper end of the drive shaft with a first (or upper) universal joint, thereby allowing rotational torque to be transferred from the rotor to the drive shaft irrespective of the eccentric motion of the rotor or fact that the output shaft and drive shaft are not coaxially aligned.

The bearing assembly typically incorporates an elongate tubular mandrel having an upper end coupled to the lower end of the drive shaft by means of a second (or lower) universal joint, and a lower end coupled to the drill bit. The mandrel is encased in a tubular bearing housing that connects to the tubular drive shaft housing above. The mandrel rotates concentrically within the bearing housing.

The universal joint assemblies of conventional driveshafts tend to wear or fail relatively quickly during operation. In particular, many such conventional driveshafts transfer torque through either point or line contact(s), which disperse a large amount of force over a relatively small surface area, thereby tending to accelerate wear at such contact surfaces.

BRIEF SUMMARY OF THE DISCLOSURE

Some embodiments are directed to a driveshaft assembly for a downhole motor in an embodiment, the driveshaft assembly includes a driveshaft having a longitudinal axis, a first end, and a second end opposite the first end. The first end of the driveshaft includes a first connection lug extending circumferentially from a first end to a second end, a second connection lug extending circumferentially from a first end to a second end, and a first convex spherical bearing surface configured to transfer axial thrust loads. The spherical bearing surface has a center of curvature disposed along the longitudinal axis. The first connection lug includes a first recess at the first end of the first connection lug, wherein the first recess comprises a concave cylindrical surface concentrically disposed about a first pivot axis oriented orthogonal to the longitudinal axis and intersecting the center of curvature of the spherical bearing surface. The second connection lug includes a second recess at the first end of the second connection lug, wherein the second recess comprises a concave cylindrical surface concentrically disposed about the first pivot axis. In addition, the driveshaft assembly includes a first torque transfer key disposed within the first recess, wherein the first torque transfer key includes a convex cylindrical surface concentrically disposed about the first pivot axis and a planar surface, wherein the convex cylindrical surface of the first torque transfer key is configured to slidingly engage the concave cylindrical surface of the first recess and to rotate about the first pivot axis relative to the driveshaft. Further, the driveshaft assembly includes a second torque transfer key disposed within the second recess, wherein the first torque transfer key includes a convex cylindrical surface concentrically disposed about the first pivot axis and a planar surface, wherein the convex cylindrical surface of the second torque transfer key is configured to slidingly engage the concave cylindrical surface of the second recess and to rotate about the first pivot axis relative to the driveshaft. Still further, the driveshaft assembly includes a first end housing having a central axis, a first end, a second end opposite the first end, and a receptacle extending axially from the first end, wherein the first end of the driveshaft is disposed within the receptacle. The first pivot axis intersects each of the first torque transfer key and the second torque transfer key. The driveshaft is configured to pivot about the first pivot axis relative to the first end housing while each torque transfer key transfers torque between the driveshaft and the first end housing.

Other embodiments are directed to a mud motor. In an embodiment, the mud motor includes a power section configured to convert drilling fluid pressure into rotational torque and a bearing assembly configured to be coupled to a drill bit. In addition, the mud motor includes a driveshaft assembly disposed between the power section and the bearing assembly. The driveshaft assembly includes an outer housing and a driveshaft rotatably disposed within the outer housing, the driveshaft having a longitudinal axis, a first end, and a second end opposite the first end. The first end of the driveshaft includes a first connection lug extending circumferentially from a first end to a second end. The first connection lug includes a first recess in the first end of the first connection lug, wherein the first recess comprises a concave cylindrical surface concentrically disposed about a first pivot axis oriented orthogonal to the longitudinal axis. In addition, the driveshaft assembly includes a first torque transfer key disposed within the first recess wherein the first torque transfer key is configured to rotate about the first pivot axis relative to the driveshaft. The first torque transfer key has a central axis radially spaced from the first pivot axis, a convex cylindrical surface concentrically disposed about the first pivot axis, and a planar surface radially opposite the convex cylindrical surface relative to the central axis. The convex cylindrical surface of the first torque transfer key slidingly engages the concave cylindrical surface of the first recess. The first pivot axis intersects the first torque transfer key. Further, the driveshaft assembly includes a first end housing having a central axis, a first end, a second end opposite the first end, and a receptacle extending axially from the first end, wherein the first end of the driveshaft is disposed within the receptacle. The first end of the driveshaft includes a convex spherical bearing surface configured to transfer axial thrust loads between the driveshaft and the first end housing. The driveshaft is configured to pivot about the first pivot axis relative to the first end housing while the first torque transfer key transfers torque between the driveshaft and the first end housing.

Still other embodiments are directed to a driveshaft assembly for a downhole motor. In an embodiment, the driveshaft assembly includes a driveshaft having a longitudinal axis, a first end, a second end opposite the first end, and a first convex spherical bearing surface disposed at the first end and configured to transfer axial thrust loads. In addition, the driveshaft assembly includes a first connection lug disposed at the first end of the driveshaft, wherein the first connection lug extends circumferentially from a first end to a second end. The first connection lug includes a first recess in the first end of the first connection lug. The first recess comprises a concave cylindrical surface concentrically disposed about a first pivot axis oriented orthogonal to the longitudinal axis. Further, the driveshaft assembly includes a first torque transfer key disposed within the first recess, wherein the first torque transfer key has a central axis radially spaced from the first pivot axis, a convex cylindrical surface concentrically disposed about the first pivot axis, and a planar surface radially opposite the convex cylindrical surface relative to the central axis. The convex cylindrical surface of the first torque transfer key slidingly engages the concave cylindrical surface of the first recess. The first pivot axis intersects the first torque transfer key.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 6 is another perspective view of the lower end of the driveshaft of FIG. 1 illustrating the installation of a pair of torque transfer keys;

FIG. 7 is a perspective view of one of the torque transfer keys of FIG. 6;

FIG. 8 is a top view of one of the torque transfer keys of FIG. 6;

FIG. 15 is a perspective view of an embodiment of a torque transfer key for use with the driveshaft of FIG. 1 in accordance with the principles disclosed herein;

FIG. 16 is a side view of the torque transfer key of FIG. 15;

FIG. 17 is a top view of the torque transfer key of FIG. 15;

DETAILED DESCRIPTION OF THE PREFERRED EMBODIMENTS

Figure 1:
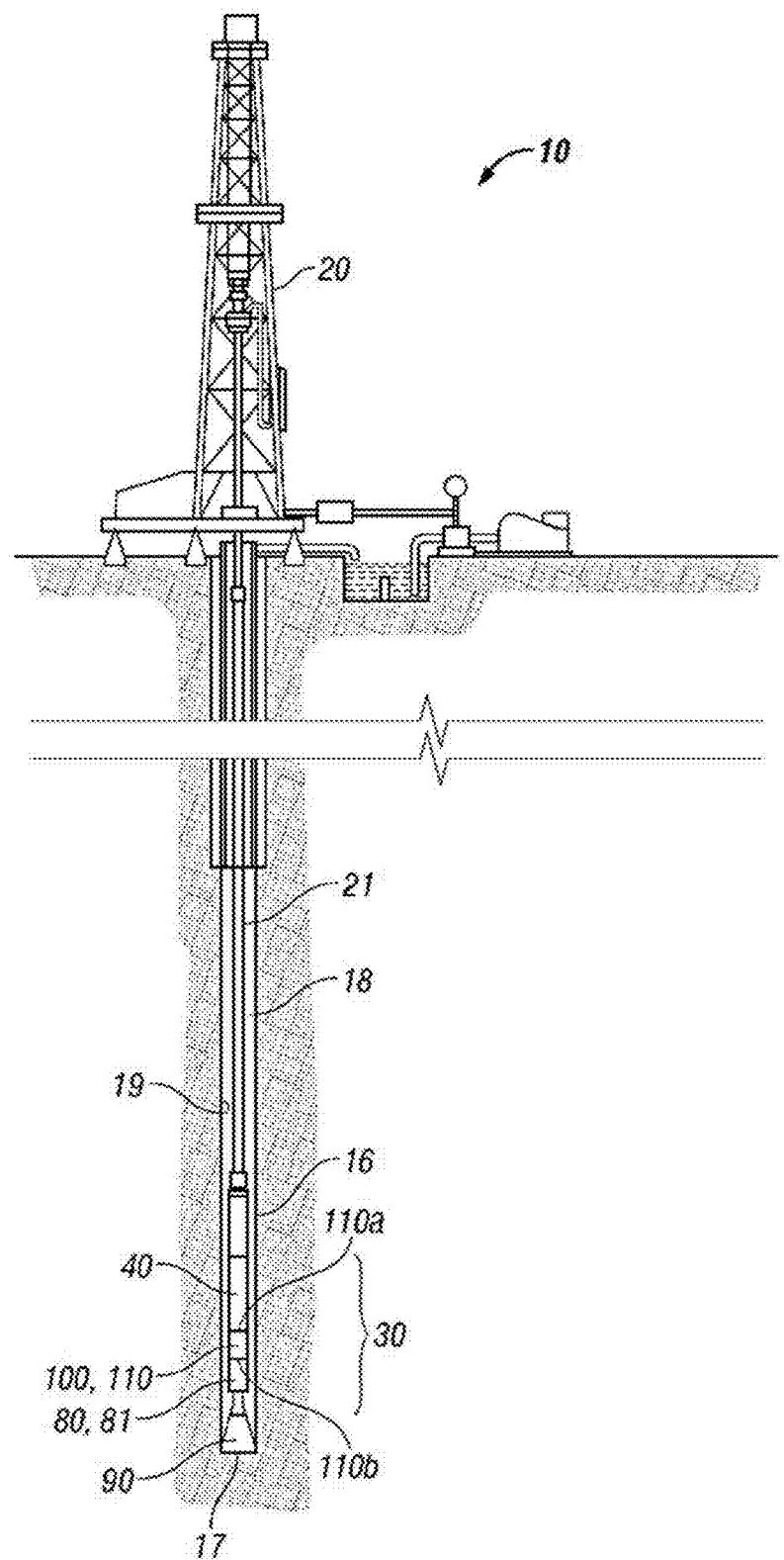
FIG. 1 is a schematic partial cross-sectional view of an embodiment of a drilling system including an embodiment of a driveshaft assembly in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

Referring now to FIG. 1, a system 10 for drilling a borehole 16 in an earthen formation is shown. In this embodiment, system 10 includes a drilling rig 20 disposed at the surface, a drill string 21 extending from rig 20 into borehole 16, a downhole motor 30, and a drill bit 90. Motor 30 forms a part of the bottomhole assembly ("BHA") and is disposed between the lower end of the drill string 21 and drill bit 90. Moving downward along the BHA towards bit 90, motor 30 includes a hydraulic drive or power section 40, a driveshaft assembly 100 coupled to power section 40, and a bearing assembly 80 coupled to driveshaft assembly 100. Bit 90 is coupled to the lower end of bearing assembly 80.

The hydraulic drive section 40 converts pressure exerted by drilling fluid pumped down drill string 21 into rotational torque that is transferred through driveshaft assembly 100 and bearing assembly 80 to drill bit 90. With force or weight applied to the drill bit 90, also referred to as weight-on-bit ("WOB"), the rotating drill bit 90 engages the earthen formation and proceeds to form borehole 16 along a predetermined path toward a target zone. The drilling fluid or mud pumped down the drill string 21 and through motor 30 passes out of the face of drill bit 90 and back up the annulus 18 formed between drill string 21 and the sidewall 19 of borehole 16. The drilling fluid cools the bit 90, flushes the cuttings away from the face of bit 90, and carries the cuttings to the surface.

Figure 2:
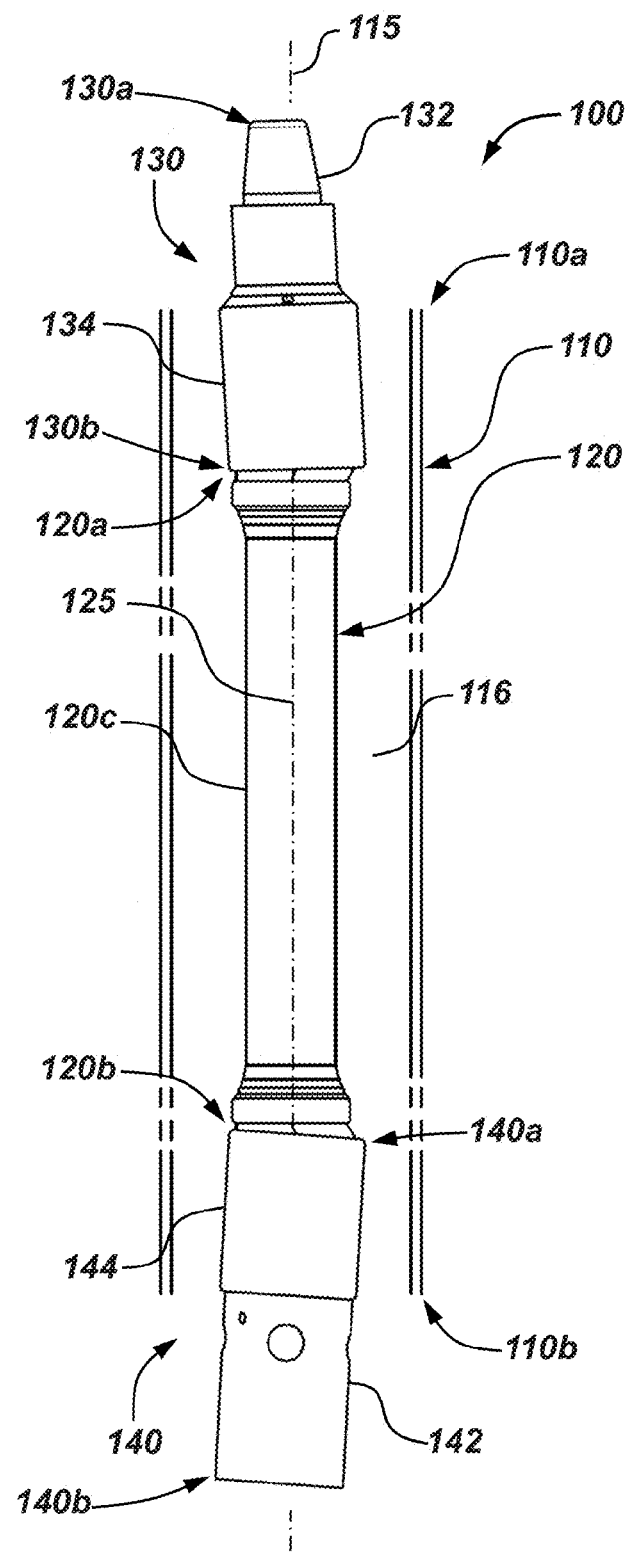
FIG. 2 is a partial cross-sectional side view of the driveshaft assembly of FIG. 1.

Referring now to FIG. 2, driveshaft assembly 100 includes an outer driveshaft housing 110, a driveshaft 120 rotatably disposed within housing 110, a first or upper end housing 130 coupled to driveshaft 120, and a second or lower end housing 140 coupled to driveshaft 120. Housing 110 is an elongate, cylindrical tubular member having a central or longitudinal axis 115, a first or upper end 110a, and a second or lower end 110b opposite upper end 110a. As is best shown in FIG. 1, in this embodiment, housing 110 is coaxially aligned with hydraulic drive section 40 and bearing assembly 80. In addition, upper end 110a of housing 110 is coupled to an outer housing of drive section 40 and lower end 110b of housing 110 is coupled to an outer housing of bearing assembly 80.

Referring again to FIG. 2, driveshaft 120 has a central or longitudinal axis 125, a first or upper end 120a, a second or lower end 120b opposite end 120a, and a generally cylindrical radially outer surface 120c extending axially between ends 120a, 120b. As will be described in more detail below, axis 125 of shaft 120 is not coaxially aligned with axis 115 of housing 110. An annular space 116 is formed between drive shaft housing 110 and driveshaft 120. During drilling operations, drilling fluid is pumped down drill string 21 and through downhole motor 30 to drill bit 90. Within driveshaft assembly 100, drilling fluid flows through annular space 116 from upper end 110a to lower end 110b in route to bearing assembly 80 and drill bit 90.

Upper end housing 130 has a first or upper end 130a, a second or lower end 130b opposite end 130a, a connector section 132 extending from upper end 130a, and a socket section 134 extending from connector section 132 to lower end 130b. In this embodiment, connector section 132 is a male pin or pin end that threadably connects upper end housing 130 to the output shaft of hydraulic drive section 40. Socket section 134 receives upper end 120a of drive shaft 120. As will be described in more detail below, the coupling between upper end 120a and socket section 134 allows driveshaft 120 to pivot about end 120a relative to end housing 130 while simultaneously transferring rotational torque and axial thrust loads between end housing 130 and driveshaft 120.

Lower end housing 140 has a first or upper end 140a, a second or lower end 140b, a connector section 142 extending from upper end 140a, and a socket section 134 extending from connector section 142 to the lower end 140b. In this embodiment, connector section 142 is a female box or box end that threadably connects lower end housing 140 to the mandrel of bearing assembly 80. Socket section 144 receives lower end 120b of driveshaft 120. As will be described in more detail below, the coupling between lower end 120b and socket section 144 allows driveshaft 120 to pivot about end 120b relative to end housing 140 while simultaneously transferring rotational torque and axial thrust loads between end housing 140 and driveshaft 120.

In this embodiment, ends 120a, 120b of driveshaft 120 are structurally identical, and socket sections 134, 144 are structurally identical. Therefore, in the description to follow and associated Figures, the details of lower end 120b, corresponding socket section 144, and the connection therebetween are shown and described, it being understood that upper end 120a, corresponding socket section 134, and the connection therebetween, respectively, are the same.

Figure 3:
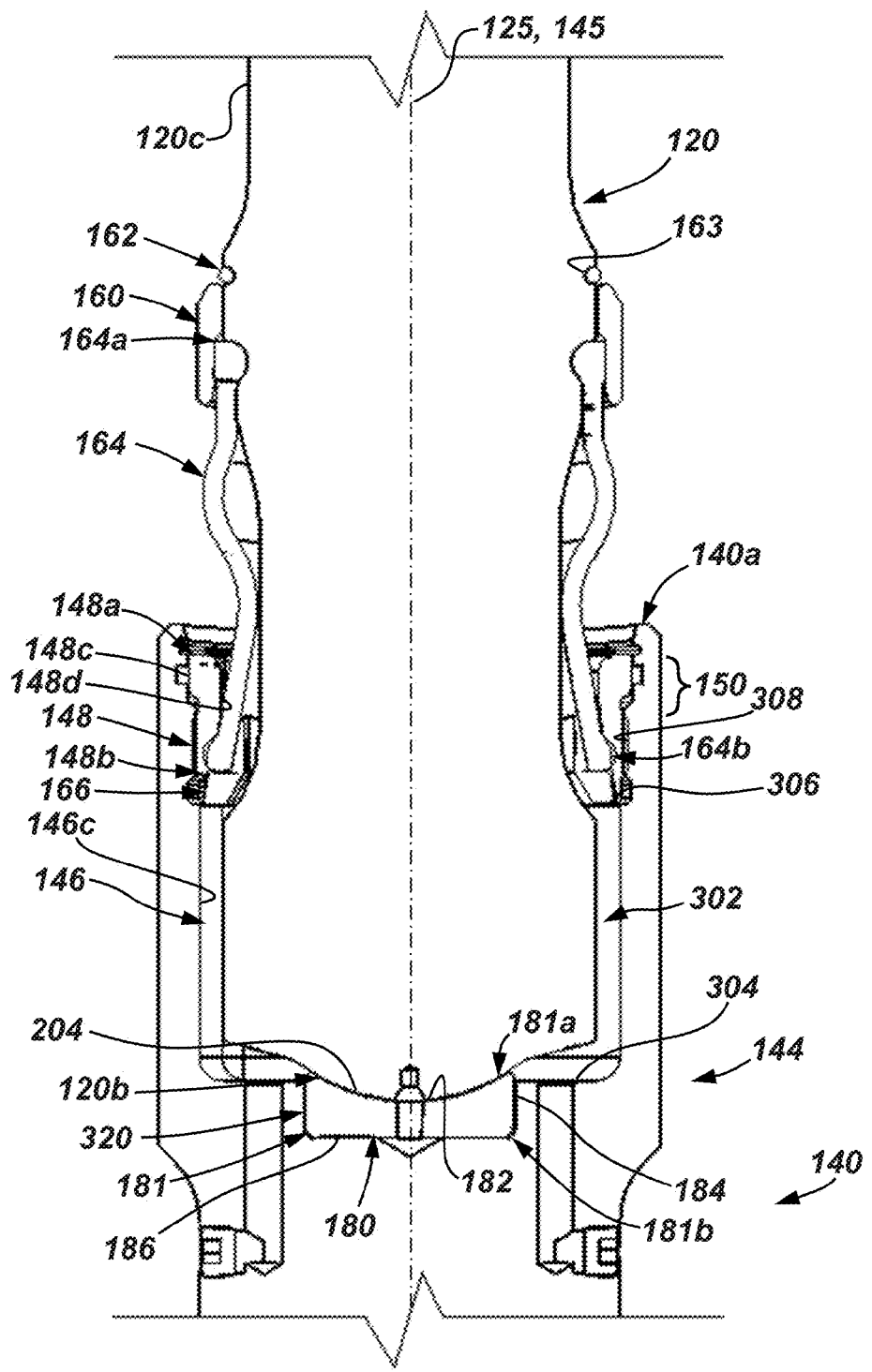
FIG. 3 is an enlarged cross-sectional side view of one of the universal joint assemblies of FIG. 1.

Referring now to FIG. 3, lower end 120b of driveshaft 120 and socket section 144 of lower end housing 140 are shown. Socket section 144 has a central or longitudinal axis 145 and includes a receptacle 146 that extends axially from end 140a and receives lower end 120b of driveshaft 120.

Figure 11:
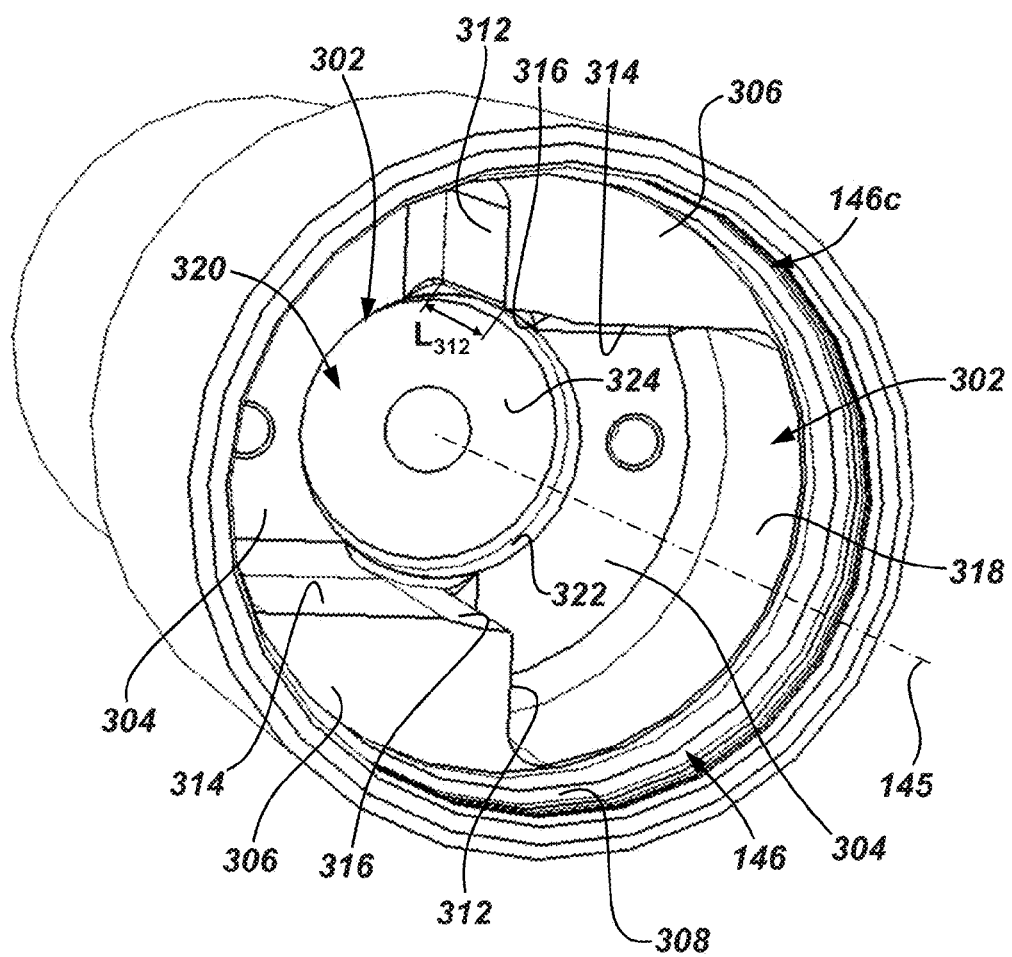
FIG. 11 is an perspective view of the lower end housing of the driveshaft assembly of FIG. 1.

Referring briefly to FIGS. 3 and 11, receptacle 146 is defined by a radially inner surface 146c. Moving axially from upper end 140a, inner surface 146c includes an upper generally cylindrical surface 308 extending axially from upper end 140a, a plurality of circumferentially spaced shoulders 306 extending radially inward from surface 308 (e.g., in this embodiment, there are a total of two shoulders 306), a plurality of circumferentially-spaced pockets 302 extending axially from shoulders 306, a plurality of circumferentially spaced surfaces 304 extending radially inward from pockets 302 (e.g., in this embodiment, there are a total of two surfaces 304), and a cylindrical counterbore or recess 320 extending axially from surfaces 304. Shoulders 306 and surfaces 304 are planar surfaces disposed in planes oriented perpendicular to axis 145. As is best shown in FIG. 3, in this embodiment, a bearing insert 180 is disposed within recess 320. Insert 180 includes a body 181 coaxially aligned with the axis 145 and having a first or upper end 181a, and a second or lower end 181b opposite the upper end 181a. In this embodiment, the upper end 181a includes a generally upward facing concave spherical bearing surface 182, lower end 181b comprises a generally planar surface 186 oriented perpendicular to axis 145, and a cylindrical surface 184 extending axially between ends 181a, 181b. As shown in FIG. 3, insert 180 is seated within recess 320 such that bearing surface 182 faces axially upward. As will be described in more detail below, lower end 120b of shaft 120 is disposed within the receptacle 146 such that lower end 120b of shaft 120 mates with and slidingly engages bearing surface 182.

Referring still to FIG. 3, a mounting collar 148 is disposed within the receptacle 146 proximate upper end 140a. In general mounting collar includes a first or upper end 148a, a second or lower end 148b axially opposite the upper end 148a, a radially outer surface 148c, and a radially inner surface 148d. Collar 148 is threaded into receptacle 146, via engagement of mating external threads on outer surface 148c and internal threads on surface 308. An annular seal assembly 150 is radially positioned between surfaces 148c, 308 to prevent fluid flow therebetween.

A flexible closure boot 164 is provided to prevent drilling mud from flowing into receptacle 146 during drilling operations. Closure boot 164 is disposed about driveshaft 120 proximate lower end 120b and has a first or upper end 164a coupled to driveshaft 120 with a lock ring 160 and a second or lower end 164b coupled to end housing 140 with collar 148 and an L-shaped compression ring 166. Thus, closure boot 164 extends radially between driveshaft 120 and end housing 140. More specifically, upper end 164a of boot 164 is seated in an annular recess on outer surface 120c of driveshaft 120, and a lock ring 160 is disposed on shaft 120 over end 164a, thereby holding end 164a in position between ring 160 and shaft 120 via an interference fit. A snap ring 162 is disposed in a circumferential groove 163 in outer surface 120c and axially retains ring 160 on shaft 120. Lower end 164b of boot 164 is similarly held in position through an interference fit. In particular, lower end 164b is seated in an annular recess on inner surface 148c and compressed between collar 148 and compression ring 166 disposed in receptacle 146.

Figure 4:
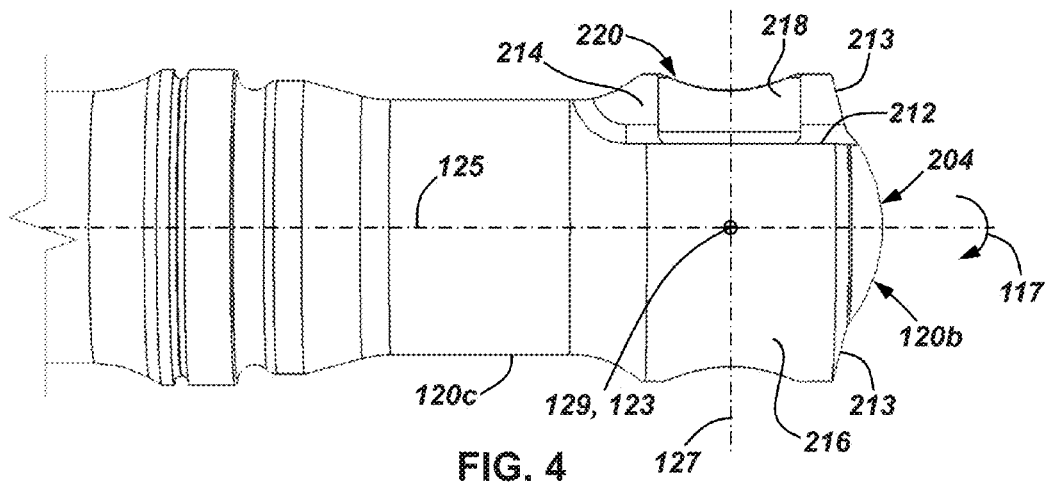
FIG. 4 is a side view of the lower end of the driveshaft of FIG. 1.
Figure 5:
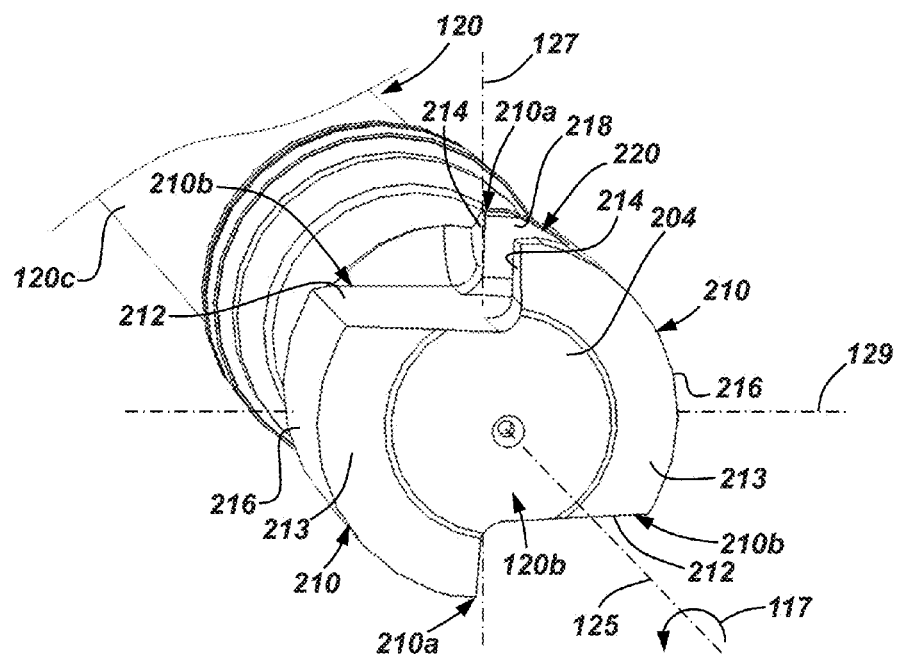
FIG. 5 is a perspective view of the lower end of the driveshaft of FIG. 1.

Referring now to FIGS. 4 and 5, lower end 120b of shaft 120 is shown. In this embodiment, lower end 120b includes a convex spherical surface 204 extending axially from the end 120b and concentrically disposed about axis 125. Surface 204 slidingly engages mating concave spherical surface 182 of insert 180 during drilling operations and thus supports thrust loads oriented along the axis 125. As will be described in more detail below, during rotation of shaft 120 about axis 125 (e.g., in direction 117), shaft 120 is free to pivot at lower end 120b about a first pivot axis 127 and a second pivot axis 129. Axes 127, 129 are oriented orthogonal to each other and intersect at a center point 123 disposed along axis 125. Thus, axes 125, 127, 129 intersect at center 123. In addition, axes 127, 129 lie in a plane oriented perpendicular to axis 125. Further, in this embodiment, center 123 also corresponds to the center of curvature of surface 204 such that sliding engagement between the concave spherical surface 182 of insert 180 and the surface 204 allows driveshaft 120 to pivot about center 123 during operation. Still further, it should be appreciated that in this embodiment no throughbore extends through driveshaft 120 and thus also does not extend through surface 204.

In this embodiment, shaft 120 includes a pair of circumferentially-spaced connection lugs 210 at lower end 120b. Each lug 210 extends circumferentially between a first end 210a and a second end 210b. First end 210a of each lug 210 comprises a planar surface 214 disposed in a plane oriented parallel to axes 125, 127 and perpendicular to axis 129, and second end 210b of each lug 210 comprises a planar surface 212 disposed in a plane oriented parallel to axes 125, 129 and perpendicular to axis 127. Surfaces 212, 214 of a given lug 210 lie in planes oriented perpendicular to each other. A cylindrical surface 216 extends circumferentially between surfaces 212, 214 of each lug 210 and is concentrically disposed about axis 125. Surfaces 212, 214, 216 define portions of outer surface 120c of shaft 120 at end 120b. In this embodiment, lugs 210 are generally angularly-spaced 180° apart about axis 125. In particular, surfaces 212 are angularly-spaced 180° apart about axis 125 and surfaces 214 are angularly-spaced 180° apart about axis 125. Thus, surface 212 of each lug 210 is disposed in a plane that is oriented perpendicular to a plane containing surface 214 of the adjacent lug 210.

Each lug 210 also includes a frustoconical surface 213 extending circumferentially between surfaces 212, 214 and radially from surface 216 to surface 204. Surfaces 213 are disposed in a common cone. In addition, each lug 210 includes a recess 220 at the first end 210a. In particular, in this embodiment, for each lug 210 a recess 220 extends generally radially into surface 214 relative to axis 127 and extends generally radially inward to surface 216 relative to axis 125. Each recess 220 is defined by a cylindrical surface 218 extending generally radially from surface 212 of the adjacent lug 210 to cylindrical surface 216. In this embodiment, surface 218 is concentrically disposed about axis 127.

Referring now to FIGS. 6-8, a pair of generally D-shaped torque transfer keys 250 are disposed on lower end 120b of shaft 120. As is best shown in FIG. 7, each key 250 comprises a body 252 having a central axis 255, a first or top side 252a, a second or bottom side 252b axially opposite the top side 252a, a first lateral side 252c, and a second lateral side 252d radially opposite the first lateral side 252c. In this embodiment, the axis 255 passes through the center of mass of key 250 and is parallel to axis 127 when key 250 is installed on lower end 120b of driveshaft 120. In addition, in this embodiment, sides 252a, 252b comprise parallel planar surfaces 253, 259, respectively, oriented perpendicular to axis 255; side 252c comprises a planar torque transfer surface 254 extending axially between sides 252a, 252b; and side 252d comprises a convex cylindrical surface 256 extending axially between sides 252a, 252b. Surface 256 is concentric about an axis 257 that is oriented parallel to axis 255 and surface 254, and radially spaced from axis 255 and surface 254. Axes 255, 257 lie in a plane oriented perpendicular to surface 254. Further, surfaces 254, 256 intersect at edges 258a, 258b, such that surface 254 has a length $L_{254}$ extending radially between edges 258a, 258b. As is best shown in FIG. 6, each key 250 is received within one recess 220 with mating surfaces 218, 256 slidingly engaging, mating surfaces 212, 259 slidingly engaging, and axes 127, 257 coaxially aligned. In this embodiment, due to the sizing and dimensions of body 252 of each key 250, when keys 250 are received within recesses 220, the aligned axes 127, 257 pass outside of the body 252 of each key 250 and thus do not intersect key 250 during operations.

Figure 9:
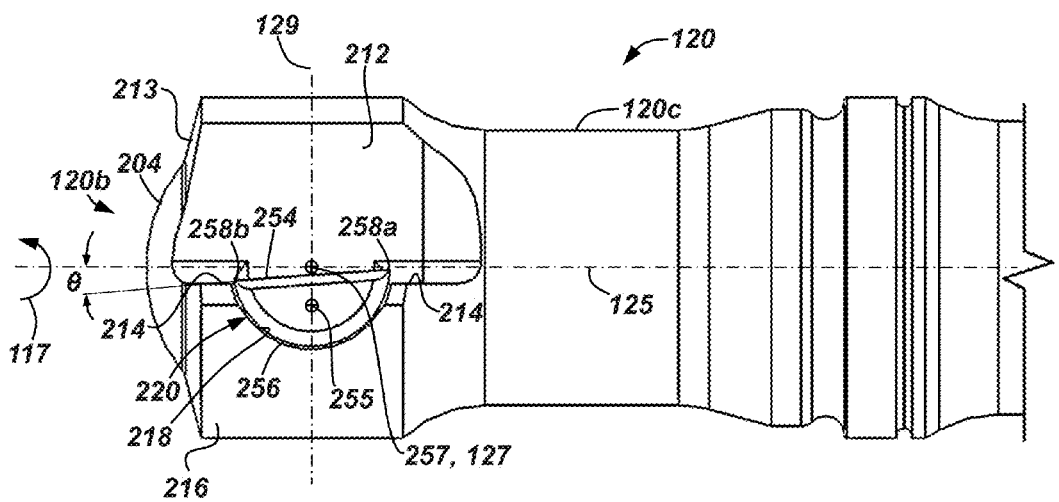
FIG. 9 is a side view of the lower end of the driveshaft of FIG. 1 illustrating the rotation of one of the torque transfer keys installed thereon.
Figure 10:
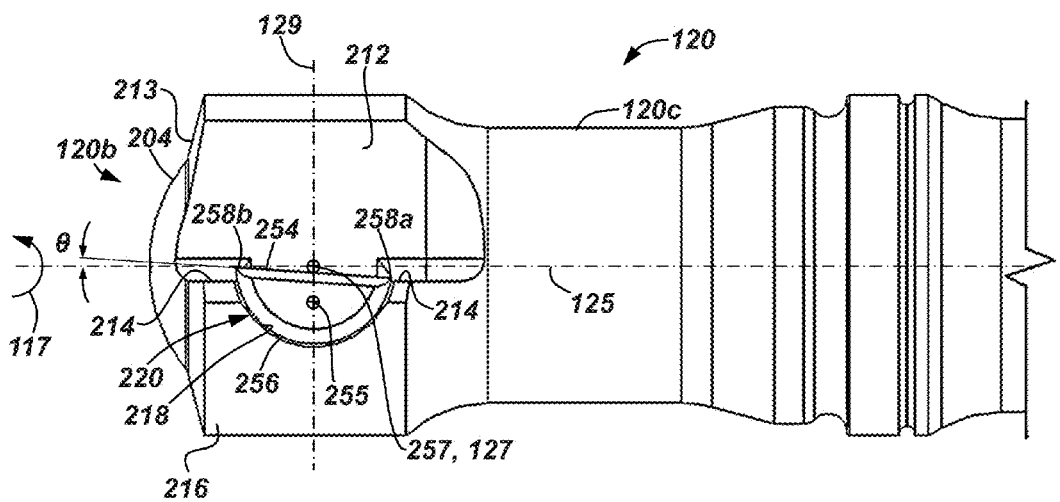
FIG. 10 is another side view of the lower end of the driveshaft of FIG. 1 illustrating the rotation of one of the torque transfer keys installed thereon.

Referring now to FIGS. 9 and 10, once installed on shaft 120, each key 250 is free to rotate about aligned axes 127, 257 with mating surfaces 218, 256 slidingly engaging. Due to rotation of a given key 250 about axes 127, 257, surface 254 can be oriented at an angle θ relative to a reference plane containing axes 125, 127, 257. In general, angle θ is a function of the angle of rotation of driveshaft 120 about axis 127 and for most drilling operations is between 0° and +/−5.0°, and even more often, between 0° and +/−2.0°. However, it should be appreciated that the value of angle θ may range widely depending on the specific application. Surface 256 is preferably sized such that edges 258a, b of each key 250 extend circumferentially beyond surfaces 214 for all anticipated values for angle θ.

Referring now to FIG. 11, as previously described, receptacle 146 is defined by a radially inner surface 146c including an upper generally cylindrical surface 308 extending axially from upper end 140a, a pair of circumferentially spaced shoulders 306 extending radially inward from surface 308, a pair of circumferentially-spaced pockets 302 extending axially from shoulders 306, a pair of circumferentially spaced surfaces 304 extending radially inward from pockets 302, and a cylindrical counterbore or recess 320 extending axially from surfaces 304. In this embodiment, two uniformly circumferentially-spaced pockets 302 are provided. Each pocket 302 is identical and defined by a first generally planar engagement surface 312 oriented parallel to axis 145, a second generally planar surface 314 oriented parallel to axis 145 and perpendicular to surface 312, and a cylindrical surface 318 extending circumferentially about axis 145 between surfaces 312, 314. As is shown in FIG. 11, each of the planar engagement surfaces 312 has a length $L_{312}$ generally measured axially between the shoulders 306 and the surfaces 304 (and thus may be referred to herein as "axial" length $L_{312}$). In this embodiment, the axial length $L_{312}$ of each surface 312 within receptacle 146 is larger than the radial length $L_{254}$ of the surface 254 of each corresponding torque transfer key 250 to maximize the contact area between each of the keys 250 and the corresponding surfaces 312 within receptacle 146. In addition, in this embodiment, the axial length $L_{312}$ of each surface 312 is the same; however, in other embodiments each of the lengths $L_{312}$ may be different while still complying with the principles disclosed herein.

In addition, each pocket 302 includes a concave curved surface 316 extending circumferentially from surface 314 of one pocket 302 to surface 312 of the adjacent pocket 302. However, it should be appreciated that in other embodiments, no surface 316 is included while still complying with the principles disclosed herein. In this embodiment, the transitions between surfaces 318, 314 and surfaces 318, 312 are radiused. As will be described in more detail below, pockets 302 are sized and shaped to receive lugs 210 and to maintain sufficient clearance for all anticipated values for the angle θ described above.

Recess 320 extends axially from surfaces 304 and is defined by a cylindrical surface 322 and a planar terminal surface 324. Cylindrical surface 322 is concentrically disposed about axis 145 and extends axially between surfaces 304, 324, while surface 324 is oriented perpendicular to the axis 145. Referring briefly to FIGS. 3 and 11, bearing insert 180 is seated in mating recess 320 with surfaces 184, 322 in sliding engagement, surfaces 186, 324 axially abutting, and with surface 182 disposed axially above surfaces 304.

Figure 12:
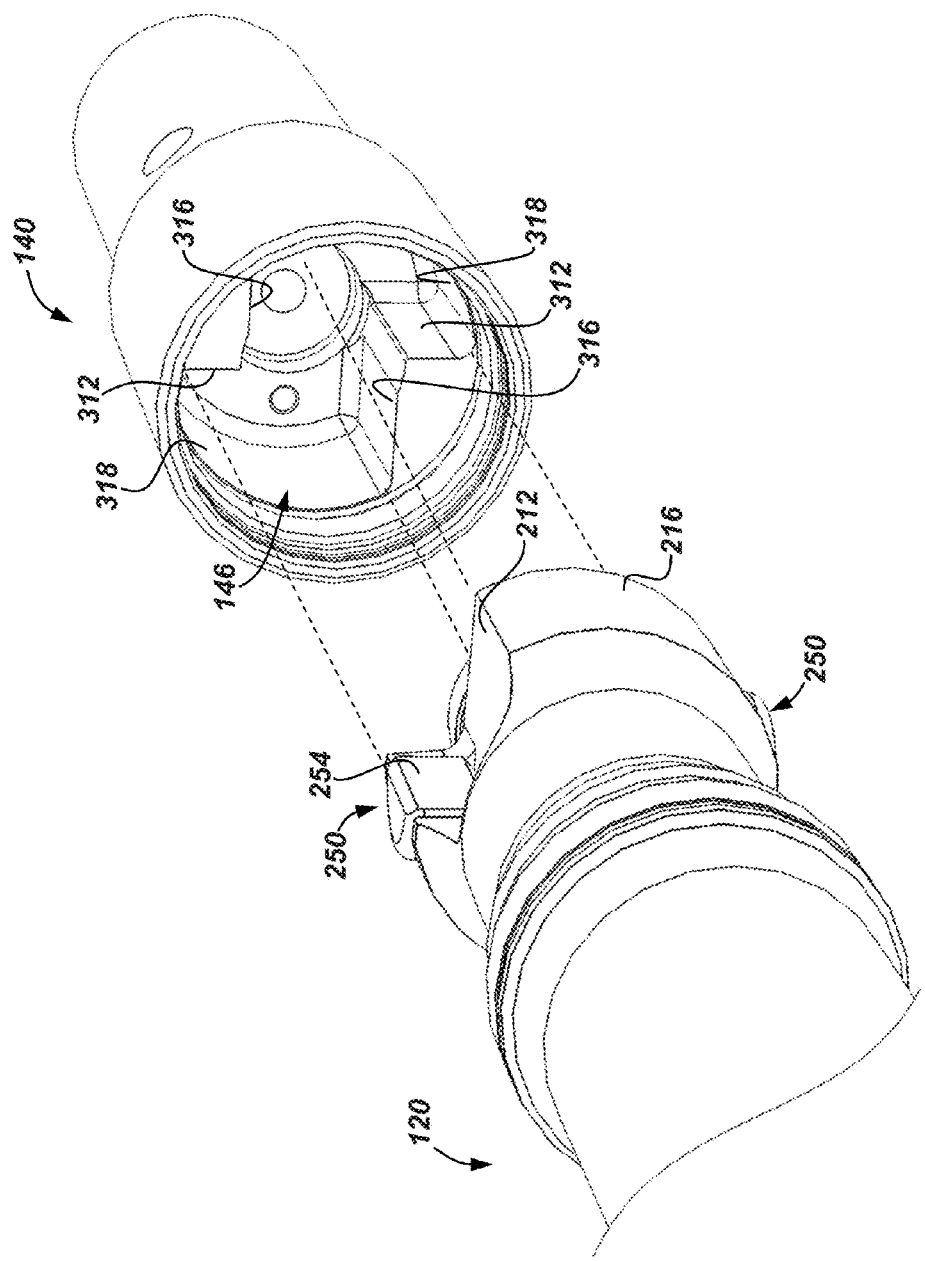
FIG. 12 is perspective view illustrating the assembly of the universal joint assembly of FIG. 3.

Referring now to FIG. 12, to makeup lower end 120b of driveshaft 120 and lower end housing 140, keys 250 are mounted to lower end 120b as previously described, and then the end 120b (with keys 250 mounted thereto) is axially advanced into receptacle 146 of end housing 140. In particular, surfaces 254 slidingly engage surfaces 312, surfaces 212 radially oppose surfaces 316, and surfaces 216 radially oppose surfaces 318. Further, in this embodiment, there is sufficient clearance between surfaces 212, 316 and surfaces 216, 318 to prevent contact from occurring between surfaces 212, 316, and 216, 318 for all anticipated values of the angle θ. The same process is employed to makeup upper end 120a and upper end housing 130.

Referring now to FIGS. 2, 3, 4, 9, 10, and 12, once driveshaft assembly 100 is fully assembled, driveshaft 120 is free to pivot relative to lower end housing 140 about center 123, while rotating about axis 125. In particular, as shaft 120 rotates about axis 125, end 120b of shaft 120 can pivot about one or both axes 127, 129 through sliding engagement of the convex spherical surface 204 of end 120b of driveshaft 120 and concave spherical surface 182 on the insert 180. Additionally, pivoting of end 120b of driveshaft 120 about axis 127 is further accommodated by sliding engagement of surface 256 of key 250 and surface 218 of recess 220 for each lug 210 on end 120b of shaft 120, while pivoting of end 120b about axis 129 is further accommodated by sliding engagement of surface 254 of keys 250 and surface 312 of each pocket 302 within receptacle 146. During rotation of shaft 120 about axis 125, torque is transferred between lower end 120b and end housing 140 via keys 250. In particular, torque is transferred between end housing 140 and lugs 210 through engagement of surfaces 218, 256 and surfaces 254, 312. Because keys 250 are allowed pivot about the axes 257, 127, keys 250 are able to maintain face-to-face contact between surfaces 254, 312 as shaft 120 pivots about axes 127, 129 simultaneous with rotation about axis 125. In this embodiment, the coupling between upper end housing 130 and upper end 120a of driveshaft 120 is structurally and functionally the same as the coupling between lower end housing 140 and lower end 120b of driveshaft 120 described above.

Figure 13:
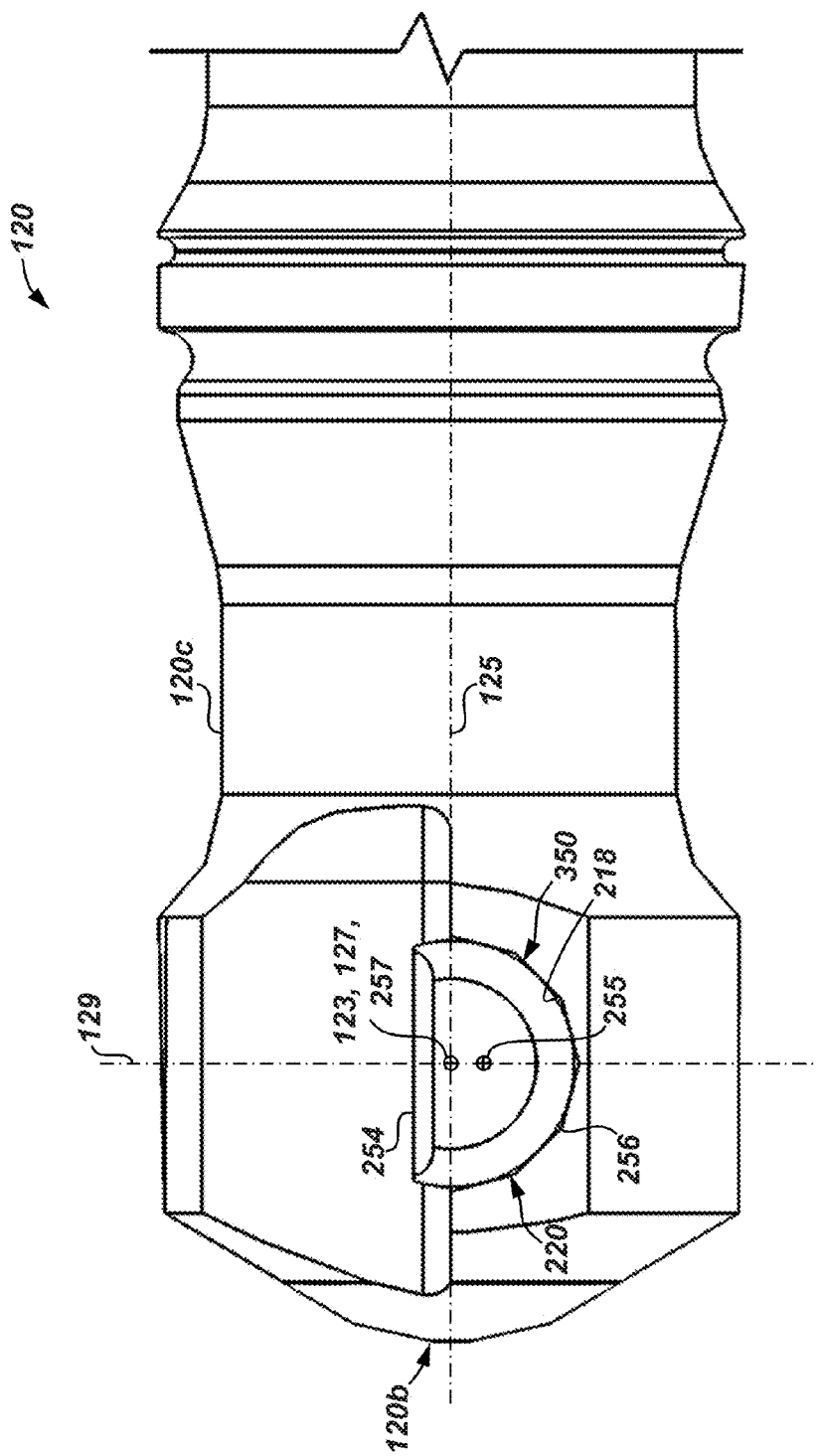
FIG. 13 is a side view of the lower end of the driveshaft of FIG. 1 including an embodiment of the torque transfer keys installed thereon in accordance with the principles disclosed herein.
Figure 14:
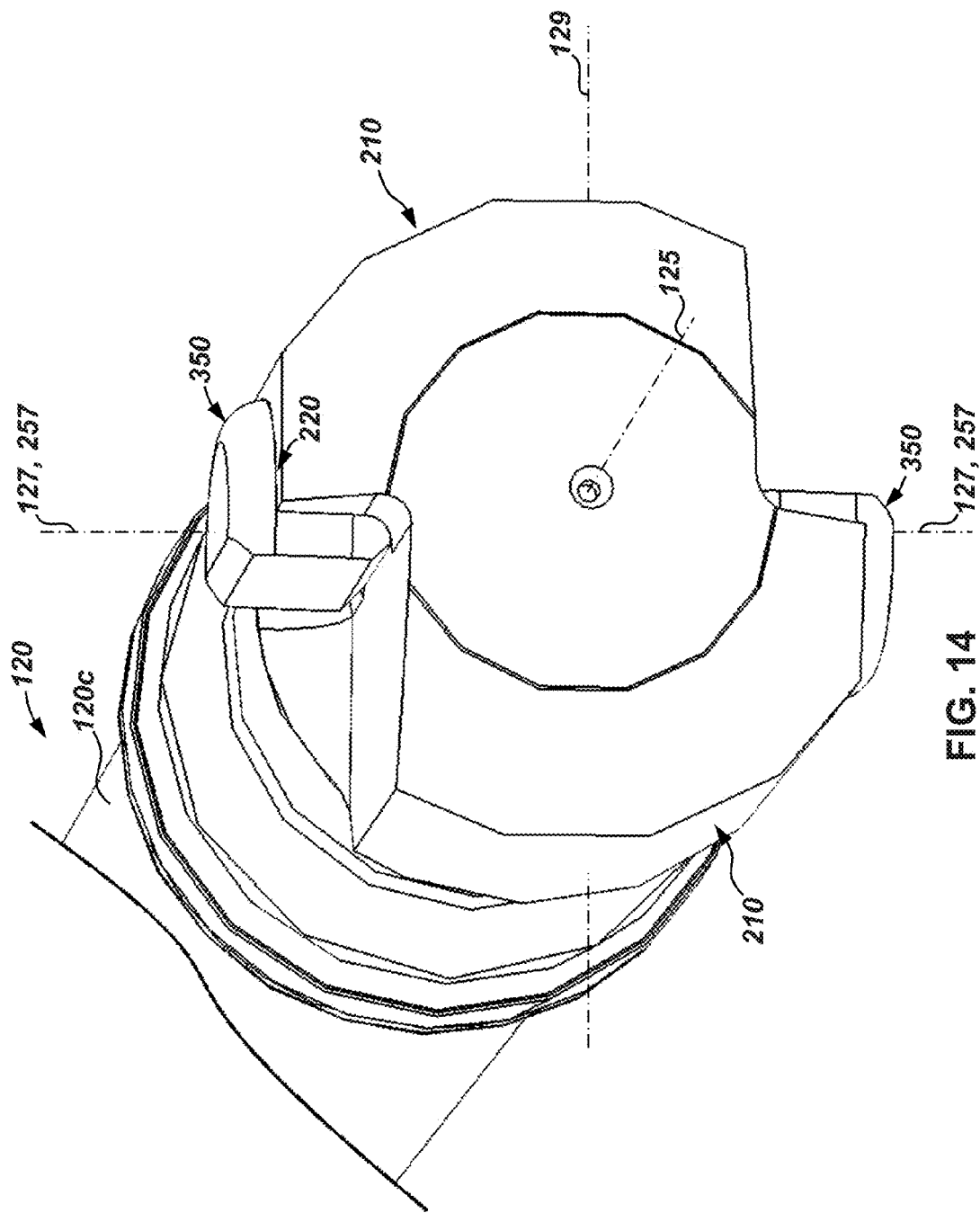
FIG. 14 is a perspective view of the lower of the lower end of the driveshaft of FIG. 13.

As previously described, for the embodiment shown in FIGS. 2, 3, 4, 9, 10, and 12, the aligned axes 127, 257 pass outside body 252 of each torque transfer key 250; however, it should be appreciated that in other embodiments of driveshaft assembly 100, keys 250 may be designed or configured such that the aligned axes 127, 257 intersect or pass through body 252 of one or both keys 250 while still complying with the principles disclosed herein. For example, referring now to FIGS. 13 and 14, a pair of torque transfer keys 350 are shown installed on lower end 120b of driveshaft 120. Each key 350 is substantially similar to the keys 250 previously described except that the convex cylindrical surface 256 is enlarged such that the axis 257 intersects the body 252 of key 350. Thus, as best shown in FIG. 14, when keys 350 are installed within recesses 220 of lugs 210 on lower end 120b of driveshaft 120, the first pivot axis 127 intersects or passes through the body 252 of each of the keys 350.

In addition, in some embodiments, the general geometry of the torque transfer keys (e.g., torque transfer keys 250, 350) may be altered to enhance or optimize the overall performance of driveshaft assembly 100 for a particular operating scenario. For example, referring now to FIGS. 15-17, an embodiment of torque transfer keys 450 is shown. Each key 450 comprises a body 452 including a central axis 455, a first or top side 452a, a second or bottom side 452b axially opposite the top side 452a, a first lateral side 452c, and a second lateral side 452d radially opposite the first lateral side 452c. In this embodiment, axis 455 passes through the center of mass of key 450. Also, side 452c includes a planar torque transfer surface 454 and side 452d includes a convex cylindrical surface 456 extending axially between the sides 452a, 452b. In this embodiment, surface 456 is concentric about an axis 457 that is oriented parallel to axis 455 and surface 454, and is radially spaced from axis 455 and surface 454. Axes 455, 457 lie within a plane that is oriented perpendicular to surface 454. Further, surfaces 454, 456 intersect at edges 458a, 458b, such that surface 454 has a length $L_{454}$ extending radially between edges 458a, 458b.

Figure 18:
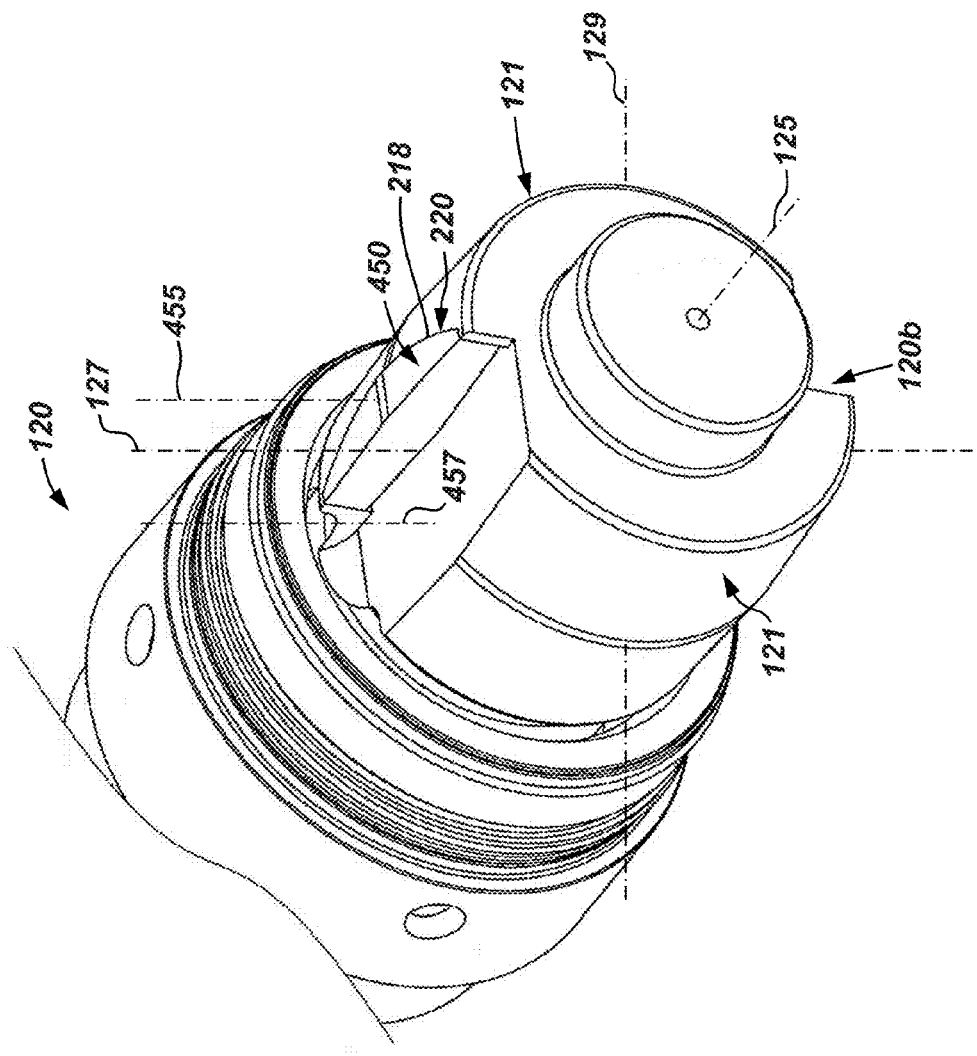
FIG. 18 is a perspective view of an embodiment of the driveshaft of FIG. 1 including a pair of the torque transfer keys of FIG. 15 installed thereon.

Referring briefly to FIG. 18, in this embodiment, due to the sizing and dimensions of body 452 of each key 450, when keys 450 are received within recesses 220, each of the axes 127, 457 pass outside of the body 452 of each key 450 and thus do not intersect key 450 during operations. In addition, in this embodiment the axis 127 is parallel to and radially spaced from each of the axis 457 and the axis 455. However, it should be appreciated that in other embodiments, the overall dimensions (e.g., the length $L_{454}$, the radius of curvature of the surface 456, etc.) may be altered such that the axis 127 is aligned with the axis 457 and/or the axis 127 passes through the body 454 of each key 450 (e.g., such as is shown for keys 350, previously described).

Figure 19:
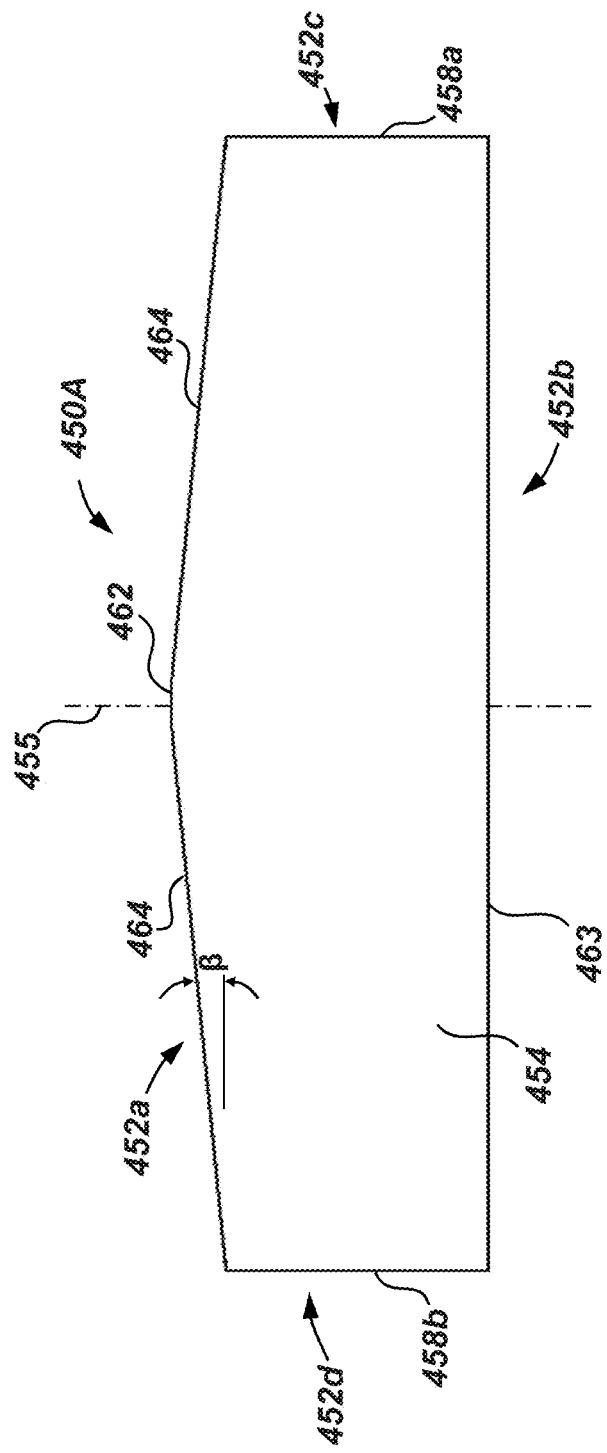
FIG. 19 is a side view of an embodiment of a torque transfer key for use with the driveshaft of FIG. 1 in accordance with the principles disclosed herein.

Referring back now to FIGS. 15-17, in this embodiment, each of the sides 452a, 452b include a central planar surface 462 extending radially between the surfaces 454, 456 and a pair of convergent surfaces 464 extending radially outward from the surface 460 toward lateral sides 452c, 452d respectively. However, it should be appreciated that in other embodiments, the side 452a and/or the side 452b may not include convergent surfaces 464 and instead may include a substantially flat surface, such as is shown for the embodiment of torque transfer key 450A shown in FIG. 19, where bottom side 452b includes a substantially flat surface 463 rather than the surfaces 464 and 462.

Referring back now to FIGS. 15-17, and in particular FIG. 16, for each of the keys 450, each surface 464 is inclined such that it is oriented at an angle β with respect to the axis 255. In some embodiments, the angle β ranges between 1° and 3°. Moreover, in this embodiment, the surfaces 464 on each side 452a, 452b are symmetric to one another about the axis 455 and the sides 452a, 452b are symmetric about a plane extending perpendicular to the axis 455 and through body 454 such that an axial height $H_{454}$ of the surface 454 is at a relative maximum between the surfaces 460 of each sides 452a, 452b and is at a relative minimum at each of the edges 458a, 458b. As will be described in more detail below, the variance or change in axial height $H_{454}$ of key 450 allows each key 450 to rock or pivot generally about the surface 460 on lower side 452b when key 450 is received within one of the recesses 220 on lower end 120b of driveshaft 120 to better accommodate pivoting of lower end 120b about the axis 129 during operations. Further, in this embodiment, each of the keys 450 is elongated radially with respect to the axis 255 such that the length $L_{454}$ is longer than the maximum axial height $H_{454}$. Still further, in some embodiments, the maximum value of height $H_{454}$ is chosen such that the clearance between side 452a and/or side 452b (depending on the specific orientation of key 450) and the corresponding surface (e.g., surface 318) within receptacle 146 is minimized.

Referring again to FIG. 18, during operation, each key 450 is received within one of the recesses 220 of lower end 120b of driveshaft 120 in a manner similar to that previously described for each of the keys 250. As previously described, in this embodiment, due to sizing of keys 450 and the curvature of surface 456, the axis 457 is radially spaced from each of the axis 455 and the pivot axis 127. In addition, in this embodiment, the recesses 220 are sized to fully accommodate the keys 450 (e.g., the size and shape of the surface 218 of each recess 220 is adjusted to allow for proper sliding engagement with the surface 456 of key 450). Once each key 450 is fully installed within one of the recesses 220 as previously described, lower end 120b of driveshaft 120 may be received within receptacle 146 of lower end housing 140 (e.g., see FIG. 11) in the same manner as previously described above, such that driveshaft 120 is free to pivot relative to lower end housing 140 about center 123 (note: center 123 is not shown in FIG. 18), while rotating about axis 125. In particular, pivoting of end 120b of driveshaft 120 about axis 127 is at least partially accommodated by sliding engagement of surface 456 of key 450 and surface 218 of recess 220 for each lug 210 on end 120b of shaft 120, and pivoting of end 120b about axis 129 is at least partially accommodated by sliding engagement of surface 454 of keys 450 and surface 312 of each pocket 302 within receptacle 146 and rocking of key 450 within recess 220 about the surface 462 on lower side 452b, as previously described.

In the manner described, through the direct engagement of such mating surfaces (e.g., such as those on keys 250, 350, 450 and corresponding mating surfaces 312 within receptacle 146), embodiments of driveshaft assembly in accordance with the principles disclosed herein enable the transfer of torque through direct, face-to-face surface contact as opposed to point or line contact. Moreover, face-to-face surface contact is maintained between corresponding recesses (e.g., recesses 220) and torque transfer keys (e.g., keys 250, 350, 450) disposed on the driveshaft (e.g., driveshaft 120). Torque transfer through such direct face-to-face contact of surfaces offers the potential to greatly reduce the rate of wear between the interacting surfaces and thereby increases the running life of the assembly 100 and other related components.

While embodiments described and disclosed herein have included connection lugs 210 that each further includes a planar surface 212 that is disposed in a plane that is oriented perpendicular to the planar surface 214 of the adjacent lug 210, it should be appreciated that in other embodiments, the surfaces 212, 214 may not be planar. Further, it should also be appreciated that in some embodiments, the surface 212 of one lug 210 may not be oriented perpendicularly to the surface 214 of an adjacent lug 210 while still complying with the principles disclosed herein. While embodiments of the torque transfer keys 250, 350, 450 have been described and disclosed herein as being substantially D-shaped, in other embodiments, the keys are formed into other shapes while still complying with the principles disclosed herein. Further, while driveshaft 120 has been described and disclosed herein as including a total of two connection lugs 210 disposed on lower end 120b and the upper end 120a, in other embodiments the upper end 120a and/or lower end 120b may include more or less than two connection lugs 210 while still complying with the principles disclosed herein. For example, in some embodiments, a total of three connection lugs 210 angularly spaced approximately 120° apart from one another about axis 125 are included on the upper end 120a and/or lower end 120b of drive shaft 120. As another example, in some embodiments, a total of four connection lugs 210 angularly spaced approximately 90° from one another about axis 125 are included on the upper end 120a and/or lower end 120b of driveshaft 120. Still further, in those embodiments in which less than or more than a total of two connections lugs 210 are included on the end 120a and/or the end 120b of driveshaft 120, more or less than two pockets 320 may be included within the receptacle (e.g., receptacle 146) in the lower end housing 140 and/or the upper end housing 130, in order to receive the corresponding connection lugs 210 during makeup of the assembly 100. For example, in those embodiments in which a total of three connections lugs 210 are included on the end 120b and/or the end 120a of driveshaft 120, a total of three pockets 302 are included in the housing 140 and/or the housing 130, respectively, in order to receive the lugs 210 during makeup of assembly 100.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A driveshaft assembly for a downhole motor, the driveshaft assembly comprising:
    a driveshaft having a longitudinal axis, a first end, and a second end opposite the first end;
    wherein the first end of the driveshaft includes a first connection lug extending circumferentially from a first end to a second end, a second connection lug extending circumferentially from a first end to a second end, and a first convex spherical bearing surface configured to transfer axial thrust loads;
    wherein the spherical bearing surface has a center of curvature disposed along the longitudinal axis;
    wherein the first connection lug includes a first recess at the first end of the first connection lug, wherein the first recess comprises a concave cylindrical surface concentrically disposed about a first pivot axis oriented orthogonal to the longitudinal axis and intersecting the center of curvature of the spherical bearing surface;
    wherein the second connection lug includes a second recess at the first end of the second connection lug, wherein the second recess comprises a concave cylindrical surface concentrically disposed about the first pivot axis;
    a first torque transfer key disposed within the first recess, wherein the first torque transfer key includes a convex cylindrical surface concentrically disposed about the first pivot axis and a planar surface, wherein the convex cylindrical surface of the first torque transfer key is configured to slidingly engage the concave cylindrical surface of the first recess and to rotate about the first pivot axis relative to the driveshaft;
    a second torque transfer key disposed within the second recess, wherein the first torque transfer key includes a convex cylindrical surface concentrically disposed about the first pivot axis and a planar surface, wherein the convex cylindrical surface of the second torque transfer key is configured to slidingly engage the concave cylindrical surface of the second recess and to rotate about the first pivot axis relative to the driveshaft; and
    a first end housing having a central axis, a first end, a second end opposite the first end, and a receptacle extending axially from the first end, wherein the first end of the driveshaft is disposed within the receptacle;
    wherein the first pivot axis intersects each of the first torque transfer key and the second torque transfer key; and
    wherein the driveshaft is configured to pivot about the first pivot axis relative to the first end housing while each torque transfer key transfers torque between the driveshaft and the first end housing.

2. The driveshaft assembly of claim 1, wherein the receptacle of the first end housing includes a pair of planar engagement surfaces, wherein each of the pair of planar engagement surfaces is configured to engage with the planar surface of one of the first torque transfer key and the second torque transfer key when the first end of the driveshaft is disposed within the receptacle;
    wherein each of the planar engagement surfaces has a length L1 measured axially with respect to the central axis of the first end housing;

wherein the planar surface of each of the first torque transfer key and the second torque transfer key has a length L2 measured perpendicularly with respect to the central axis of the first torque transfer key and the central axis of the second torque transfer key, respectively; and
wherein L1 is greater than L2.

3. The driveshaft assembly of claim 1, wherein the second end of each connection lug comprises a planar surface oriented perpendicular to the first pivot axis.

4. The driveshaft assembly of claim 1, wherein the first torque transfer key has a central axis radially spaced from the first pivot axis, wherein the planar surface is radially opposite the cylindrical surface relative to the central axis of the first torque transfer key; and
wherein the second torque transfer key has a central axis radially spaced from the first pivot axis, wherein the planar surface is radially opposite the cylindrical surface relative to the central axis of the first torque transfer key.

5. The driveshaft assembly of claim 4,
wherein the first torque transfer key includes:
a top side; and
a bottom side opposite the top side;
wherein the top side of the first torque transfer key includes a first pair of convergent planar surfaces;
wherein each of the first pair of planar surfaces is oriented at an angle β with respect to the central axis of the first torque transfer key; and
wherein the second torque transfer key includes:
a top side; and
a bottom side opposite the top side;
wherein the top side of the second torque transfer key includes a second pair of convergent planar surfaces;
wherein each of the second pair of planar surfaces is oriented at the angle β with respect to the central axis of the second torque transfer key.

6. The driveshaft assembly of claim 5, wherein the absolute value of the angle is between 1° and 3°.

7. The driveshaft assembly of claim 5, wherein each of the first pair of planar surfaces are symmetrically disposed relative to one another about the central axis of the first torque transfer key; and
wherein each of the second pair of planar surfaces are symmetrically disposed relative to one another about the central axis of the second torque transfer key.

8. A mud motor comprising:
a power section configured to convert drilling fluid pressure into rotational torque;
a bearing assembly configured to be coupled to a drill bit;
a driveshaft assembly disposed between the power section and the bearing assembly, the driveshaft assembly comprising:
an outer housing;
a driveshaft rotatably disposed within the outer housing, the driveshaft having a longitudinal axis, a first end, and a second end opposite the first end;
wherein the first end of the driveshaft includes a first connection lug extending circumferentially from a first end to a second end;
wherein the first connection lug includes a first recess in the first end of the first connection lug, wherein the first recess comprises a concave cylindrical surface concentrically disposed about a first pivot axis oriented orthogonal to the longitudinal axis;
a first torque transfer key disposed within the first recess wherein the first torque transfer key is configured to rotate about the first pivot axis relative to the driveshaft;
wherein the first torque transfer key has a central axis radially spaced from the first pivot axis, a convex cylindrical surface concentrically disposed about the first pivot axis, and a planar surface radially opposite the convex cylindrical surface relative to the central axis;
wherein the convex cylindrical surface of the first torque transfer key slidingly engages the concave cylindrical surface of the first recess;
wherein the first pivot axis intersects the first torque transfer key;
a first end housing having a central axis, a first end, a second end opposite the first end, and a receptacle extending axially from the first end, wherein the first end of the driveshaft is disposed within the receptacle;
wherein the first end of the driveshaft includes a convex spherical bearing surface configured to transfer axial thrust loads between the driveshaft and the first end housing; and
wherein the driveshaft is configured to pivot about the first pivot axis relative to the first end housing while the first torque transfer key transfers torque between the driveshaft and the first end housing.

9. The mud motor of claim 8, wherein the first convex spherical bearing surface includes a first center of curvature disposed along the longitudinal axis of the driveshaft, wherein the first pivot axis extends through the first center of curvature.

10. The mud motor of claim 8, wherein the second end of the first connection lug comprises a first planar surface.

11. The mud motor of claim 8, wherein the receptacle of the first end housing includes a planar engagement surface, wherein the planar engagement surface of the receptacle is configured to engage with the planar surface of the first torque transfer key when the first end of the driveshaft is disposed within the receptacle;
wherein the planar engagement surface has a length L1 measured axially with respect to the central axis of the first end housing;
wherein the planar surface of the first torque transfer key has a length L2 measured perpendicularly with respect to the first pivot axis when the first torque transfer key is received within the first recess; and
wherein L1 is greater than L2.

12. A driveshaft assembly for a downhole motor, the driveshaft assembly comprising:
a driveshaft having a longitudinal axis, a first end, a second end opposite the first end, and a first convex spherical bearing surface disposed at the first end and configured to transfer axial thrust loads;
a first connection lug disposed at the first end of the driveshaft, wherein the first connection lug extends circumferentially from a first end to a second end;
wherein the first connection lug includes a first recess in the first end of the first connection lug;
wherein the first recess comprises a concave cylindrical surface concentrically disposed about a first pivot axis oriented orthogonal to the longitudinal axis;
a first torque transfer key disposed within the first recess, wherein the first torque transfer key has a central axis radially spaced from the first pivot axis, a convex cylindrical surface concentrically disposed about the first pivot axis, and a planar surface radially opposite the convex cylindrical surface relative to the central axis;
wherein the convex cylindrical surface of the first torque transfer key slidingly engages the concave cylindrical surface of the first recess; and wherein the first pivot axis intersects the first torque transfer key.

13. The driveshaft assembly of claim 12, wherein the first convex spherical bearing surface includes a first center of curvature disposed along the longitudinal axis of the driveshaft, wherein the first pivot axis extends through the first center of curvature.

14. The driveshaft assembly of claim 12, wherein the first connection lug includes a radially outer cylindrical surface extending circumferentially from the first end to the second end;

wherein the recess extends radially inward from the radially outer cylindrical surface of the first connection lug.

15. The driveshaft assembly of claim 12, further comprising:

a second connection lug disposed at the first end of the driveshaft, the second connection lug extending circumferentially from a first end to a second end;

wherein the second connection lug includes a second recess in the first end of the second connection lug;

wherein the second recess comprises a concave cylindrical surface concentrically disposed about the first pivot axis;

a second torque transfer key disposed within the second recess, wherein the second torque transfer key has a central axis radially spaced from the first pivot axis, a convex cylindrical surface concentrically disposed about the first pivot axis, and a planar surface radially opposite the convex cylindrical surface of the second torque transfer key relative to the central axis of the second torque transfer key;

wherein the convex cylindrical surface of the second torque transfer key slidingly engages the concave cylindrical surface of the second recess; and wherein the first pivot axis intersects the second torque transfer key.

16. The driveshaft assembly of claim 15, wherein the first end of the first connection lug is circumferentially adjacent the second end of the second connection lug and the second end of the first connection lug is circumferentially adjacent the first end of the second connection lug.

17. The driveshaft assembly of claim 12, wherein the second end of the second connection lug comprises a planar surface oriented parallel to the central axis and perpendicular to the first pivot axis.

18. The driveshaft assembly of claim 12, wherein the first torque transfer key includes:

a top side; and a bottom side axially opposite the top side with respect to the central axis of the first torque transfer key;

wherein the top side includes a first pair of convergent planar surfaces;

wherein each of the first pair of planar surfaces is oriented at an angle $\beta$ with respect to the central axis of the first torque transfer key.

19. The driveshaft assembly of claim 18, wherein the absolute value of $\beta$ is between 1° and 3°.

20. The driveshaft assembly of claim 18, wherein each of the first pair of planar surfaces are symmetrically disposed relative to one another about the central axis of the first torque transfer key.

* * * * *